(No Model.)
E. K. ROLLINS.
ELECTRIC HIGH AND LOW WATER ALARM.
No. 341,694. Patented May 11, 1886.
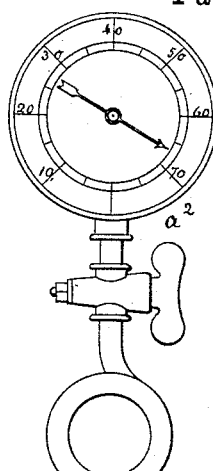
Fig 1.
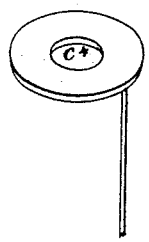
Fig 6.
Fig 2.
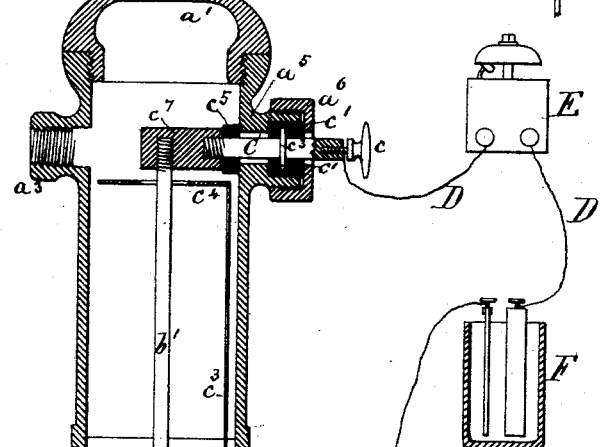
Fig 3. Fig 4.
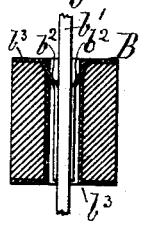
Fig 5.
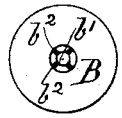
Witnesses:
B. C. Fenwick
Robt. L. Fenwick
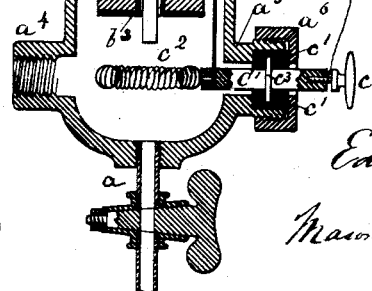
Inventor:
Edward K. Rollins
by his attys
Mason Fenwick & Lawrence
N. PETERS. Photo-Lithographer, Washington, D. C.

UNITED STATES PATENT OFFICE.

EDWARD KENT ROLLINS, OF SCRANTON, PENNSYLVANIA, ASSIGNOR OF ONE-HALF TO ALEXANDER E. HUNT, OF SAME PLACE.

ELECTRIC HIGH AND LOW WATER ALARM.

SPECIFICATION forming part of Letters Patent No. 341,694, dated May 11, 1886.

Application filed July 10, 1885. Serial No. 171,178. (No model.)

*To all whom it may concern:*

Be it known that I, EDWARD K. ROLLINS, a citizen of the United States, residing at Scranton, in the county of Lackawanna and State of Pennsylvania, have invented certain new and useful Improvements in Electric High and Low Water Alarms; and I do hereby declare the following to be a full, clear, and exact description of the invention, such as will enable others skilled in the art to which it appertains to make and use the same.

My invention consists in certain novel constructions and combinations of parts, as will be hereinafter described and specifically claimed, whereby electric alarms for steam-boilers and water or fluid reservoirs and tanks are improved and rendered very effective for sounding a signal or bell at high-water as well as at low-water mark.

In the accompanying drawings, Figure 1 is a vertical longitudinal section of my electric high and low water alarm having at its top a pressure gage shown in elevation. Fig. 2 is a horizontal section just above the float. Fig. 3 is a vertical central section, and Fig. 4 a top view, of a float of modified construction. Fig. 5 is a detail view of the lower pole-plate, and Fig. 6 a perspective view of the upper pole-plate.

The letter A in the drawings represents an upright tubular vessel closed at both ends, except as presently described. At its lower end is a discharge-cock, $a$, and at its upper end may be a cap, $a'$, having a steam-passage in it, which communicates with an ordinary pressure-gage, $a^2$, if desired. Near the top and bottom of this vessel are provided openings $a^3$ and $a^4$, by means of which and suitable connecting-pipes it is connected with a boiler or reservoir in the ordinary way, so that the surface of the water or fluid in the boiler or reservoir will always be the same as that in the vessel.

Within the vessel A a float, B, is applied so as to be held centrally therein and be truly guided up and down in a manner which will be presently described. This float may be formed entirely of metal and made hollow; or it may be of metal and wood, as represented. The construction shown in the drawings comprises a sheet-metal tube with bottom and top flanges, and around the metal tube which forms the bore of the float, and between the flanges, wood or other buoyant material is securely confined. The metal $b^3$ of tube and flanges serves as an inner lining for the tubular block of wood, and also housing for its ends, and at the same time renders the float capable of acting as a conductor of electricity, as occasion requires, for closing and breaking a circuit. This float it is intended shall have its upper end above the water or fluid $b$, which may flow into the vessel A, and it will rise and fall precisely as the water or fluid rises and falls. As shown, the float is loosely but nicely fitted by means of its tubular lining to a pendant central metal guide-rod, $b'$, which is connected by means of a metal block, $c^7$, to a horizontal post, C, said post having one of its ends extended into the vessel A, while its other end, which is outside the vessel, is provided with a binding-screw, $c$. The metal block $c^7$ will not be required in constructions where the post C and rod $b'$ are formed of one piece bent at a right angle at the point occupied by the block, or in constructions where the rod $b'$ screws directly into the inner end of the post.

The post C is held in a stuffing-box, $a^5$, of the vessel A by means of non-conducting stuffing or packing material $c'$, and in a central position, the bore of the neck of the stuffing-box and of its cap $a^6$ being sufficiently large to prevent electrical communication between the post and said parts. In order to prevent longitudinal displacement of the post, it is provided with a collar about midway of the stuffing-box, which, by occupying a position between the packing material and kept under pressure by the cap $a^6$, holds the post rigidly in its proper position.

There may be an insulating washer or block, $c^5$, interposed between the inner surface of the vessel A and the block $c^7$, in order to prevent the weight of rod $b'$ and the block $c^7$ and other influences from changing the position of the post C from a true horizontal to an inclined position, and thereby endangering the perfect insulation of said post.

A post, C', having collar $c^3$ and binding-screw $c$ all of similar construction to that of post C, is held in a similar way to that just described in a lower stuffing-box, $a^7$, having non-conducting packing and of like construction to the stuffing-box $a^5$. This post C' is provided with an annular pole-plate, $c^2$, made of spirally-wound electric conducting-wire and suitably fastened to the end of said post in a position concentric to the vessel A. An upright connecting and conducting wire, $c^3$, is suitably fastened to the post C', and provided at the top with an annular pole-plate, $c^4$, made of either solid metal or of wire shaped like $c^2$, and held concentric with the vessel A and rod $b'$.

Between the pole-plates $c^2$ $c^4$ the float B moves up and down on the rod $b'$, and by it touching either one of these pole-plates it closes the circuit of a battery, F, which is connected with the posts C C', in the usual way, by means of conducting-wires D D'. Between the length of the wire D an ordinary alarm-bell is suitably inserted, and thus the closing of the circuit causes an alarm, which is continued until the float B is, by the rising or falling of the liquid in the vessel A, removed from the pole-plate and the electric circuit broken. It is understood that the float B, in moving along the rod $b'$, is always partly in contact with it, so as to be influenced by the electricity in said rod, and thus it, by touching the pole-plates $c^2$ or $c^4$, causes the circuit to be closed instantaneously. The float may be modified by being provided with a number of conducting-springs, $b^2$, which constantly bear at opposite points with very slight pressure upon the rod $b'$, so that the float can freely move along the rod and always have electric connection with the same.

It is obvious that by omitting the upper pole-plate, $c^4$, and its connecting-wire $c^3$ the apparatus would serve simply as a low-water alarm, and by only omitting the lower pole-plate, $c^2$, it would serve simply as a high-water alarm; but in all cases the openings $a^3$ and $a^4$ are used either for water or water and steam, as aforesaid.

I contemplate employing my invention for sounding high as well as low water signals in connection with reservoirs—such as oil or water tanks and the like—when the limits of both rise and fall have been reached.

What I claim is—

The combination of the vessel A, guide and conducting rod $b'$, upper post, C, float B, fitted loosely on the guide-rod $b'$, pole-plate $c^4$, rod or bar $c^3$, lower post, C', pole-plate $c^2$, a signal or alarm bell, and an electric battery and wires, substantially as described.

In testimony whereof I affix my signature in presence of two witnesses.

EDWARD KENT ROLLINS.

Witnesses:
 A. E. HUNT,
 A. P. FOWLER.